(12) United States Patent
 Mehrotra

(10) Patent No.: US 10,977,698 B2
(45) Date of Patent: Apr. 13, 2021

(54) TRANSFORMING CONTENT MANAGEMENT IN PRODUCT MARKETING

(71) Applicant: International Business Machines Corporation, Armonk, NY (US)

(72) Inventor: Mudit Mehrotra, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/367,387

(22) Filed: Mar. 28, 2019

(65) Prior Publication Data

US 2020/0311776 A1    Oct. 1, 2020

(51) Int. Cl.
*G06Q 30/02*        (2012.01)
*G06F 40/35*        (2020.01)
*G06F 40/253*       (2020.01)
*G06F 40/232*       (2020.01)

(52) U.S. Cl.
CPC ....... *G06Q 30/0276* (2013.01); *G06F 40/253* (2020.01); *G06F 40/35* (2020.01); *G06F 40/232* (2020.01)

(58) Field of Classification Search
CPC .......................... G06Q 30/0276; G06F 40/232
USPC ...................................................... 705/14.72
See application file for complete search history.

(56) References Cited

U.S. PATENT DOCUMENTS

| 10,176,640 | B2 * | 1/2019 | Tierney | ........... G06F 3/015 |
| 2007/0203945 | A1 | 8/2007 | Louw | |
| 2012/0253858 | A1 * | 10/2012 | Glissmann | ........... G06F 40/40 705/7.11 |
| 2016/0071119 | A1 * | 3/2016 | Blanchflower | .... G06Q 30/0201 705/7.29 |
| 2016/0189246 | A1 | 6/2016 | Eldh et al. | |
| 2017/0352070 | A1 * | 12/2017 | DeLuca | ........... G06K 9/6254 |

OTHER PUBLICATIONS

Guyon (2006).*
Staab (2018).*
Peter Mell, "The NIST Definition of Cloud Computing," Special Publication 800-145; pp. 1-7, Sep. 2011.
Anonymous, "Acrolinx Announces New Integrations with Leading Enterprise CMS and Marketing Cloud Platforms" Acrolinx, https://www.acrolinx.com, pp. 1-2, Nov. 2, 2015.

* cited by examiner

*Primary Examiner* — David J Stoltenberg
*Assistant Examiner* — Michael I Ezewoko
(74) *Attorney, Agent, or Firm* — Will Stock; Otterstedt, Wallace & Kammer, LLP

(57) ABSTRACT

A method supporting content creation includes providing a content creation software product with a tone tool, receiving, by the tone tool, an expected tone range for a parameter of tone, receiving content, evaluating, by the tone tool, each of a plurality of portions of the content to determine a tone of the respective portions of the content, comparing the tone of each of the plurality of portions of the content to the expected tone range for the parameter, and providing, by the tone tool, at least one proposed modification of the content affecting a change in the tone of at least one of the portions of the content.

12 Claims, 5 Drawing Sheets

TRANSFORMING CONTENT MANAGEMENT IN PRODUCT MARKETING

BACKGROUND

The present disclosure relates generally to content management, and more particularly to management of content for control of tone.

There are multiple channels for developing and publishing content. These include websites, mobile sites, mail campaigns, social media posts, brochures, catalogs, apps, etc. Developing and maintaining content across such diverse modes of publishing is a challenging task. For example, one important goal of many marketing campaigns is ensuring the right marketing messages reach the right set of customers at the right time. While it is important to focus on what is being communicated, an important part of any marketing message is tone. In many cases it is important to control the tone of the marketing message across all channels.

SUMMARY

According to some embodiments, a method supporting content creation comprises augmenting a content creation software product with a tone tool, determining, by the tone tool, a tone range for content, evaluating, by the tone tool, a tone of a plurality of portions of the content, comparing the tone of each of the plurality of portions to the tone range, and providing, by the tone tool, at least one proposed modification of the content affecting a change in the tone of at least one of the portions of the content.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

automated support for tonal adjustment in content; and
automated alerts for tones outside a predetermined range.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
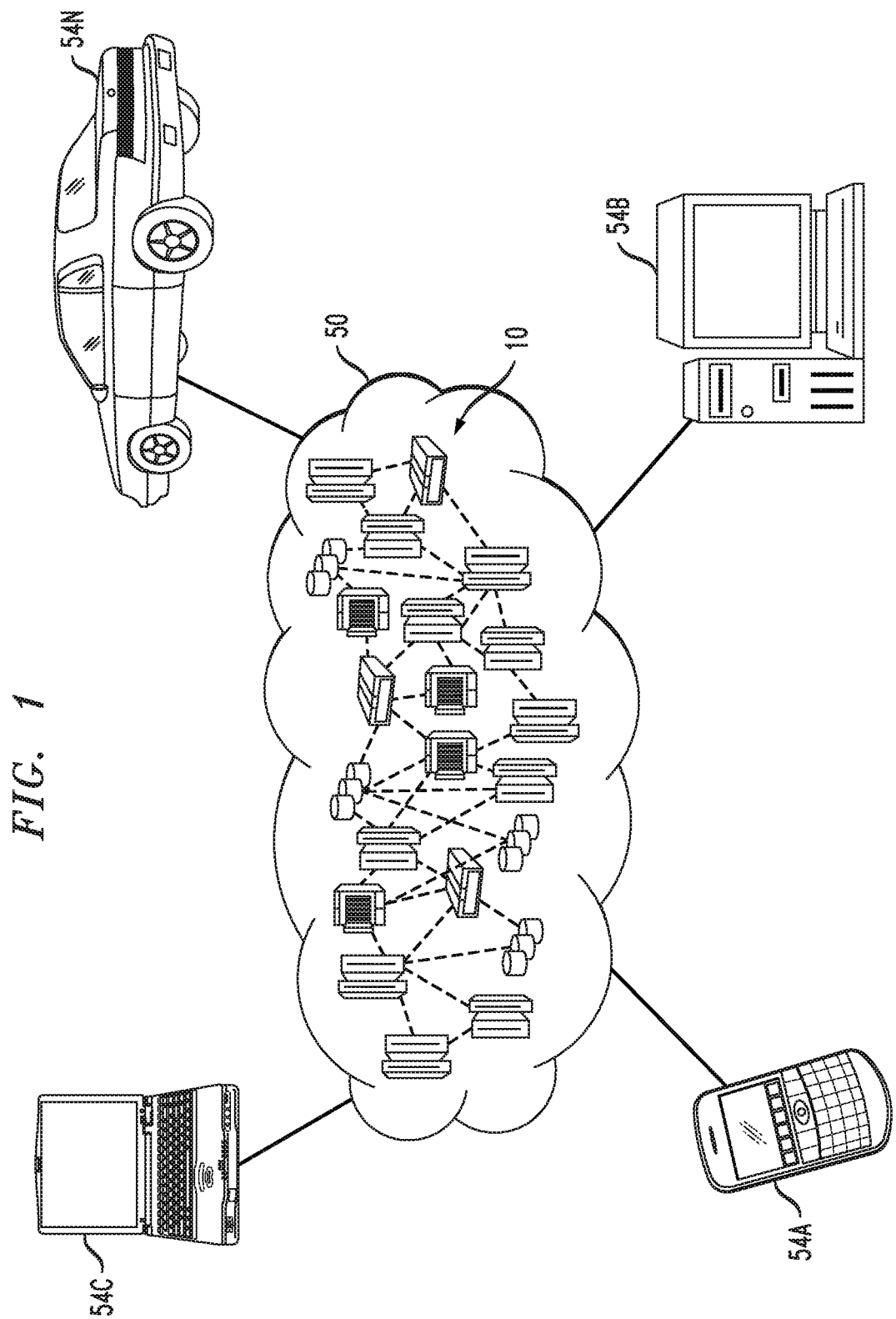
FIG. 1 depicts a cloud computing environment according to an embodiment of the present invention.

Embodiments of the present invention are directed to methods for controlling tone of content using the cognitive capabilities and natural language processing of an artificial intelligence system for tone analysis. Embodiments of the present invention improve on the capabilities of existing systems and tools including Watson tone analyzer and Watson alchemy API. These tools use a document level analysis determine an overall tone of a document, and use sentence level analysis to identify specific areas of content where certain tones are strongest.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
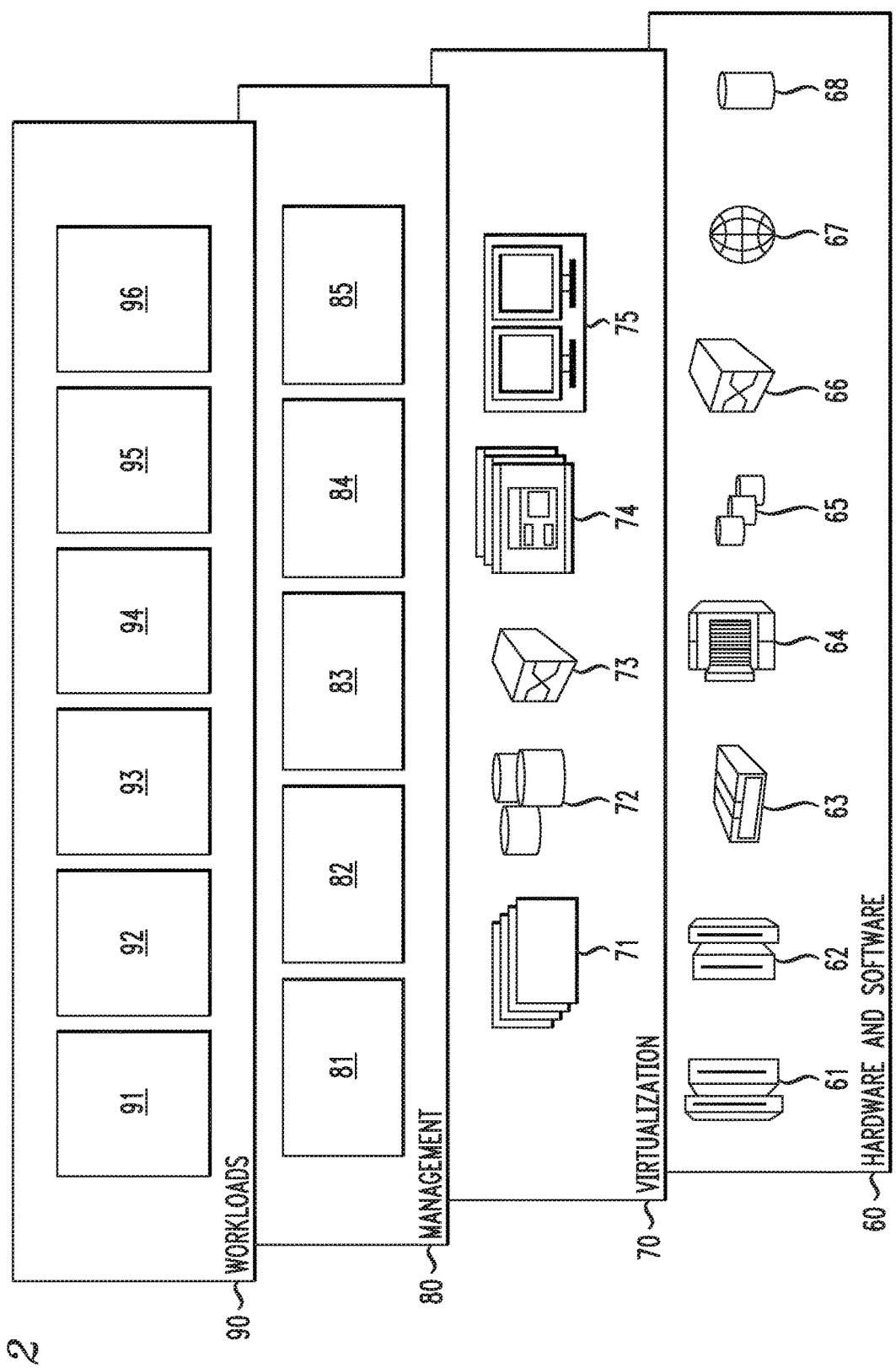
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a software tool within a content development editor, wherein the software tool processes a workflow while measuring variance of the content's tone is compared to a predetermined tone range 96.

Tone analysis, for example, as provided by the IBM® Watson® Tone Analyzer Service, includes linguistic analysis to detect one or more different types of tones in text. The tone types include, for example, emotions, social tendencies and writing style. Emotions can include anger, fear, joy, sadness and disgust. Social tendencies can include personality traits such as openness, conscientiousness, extraversion, agreeableness, and emotional range. Writing styles can include confident, analytical, and tentative.

Figure 3:
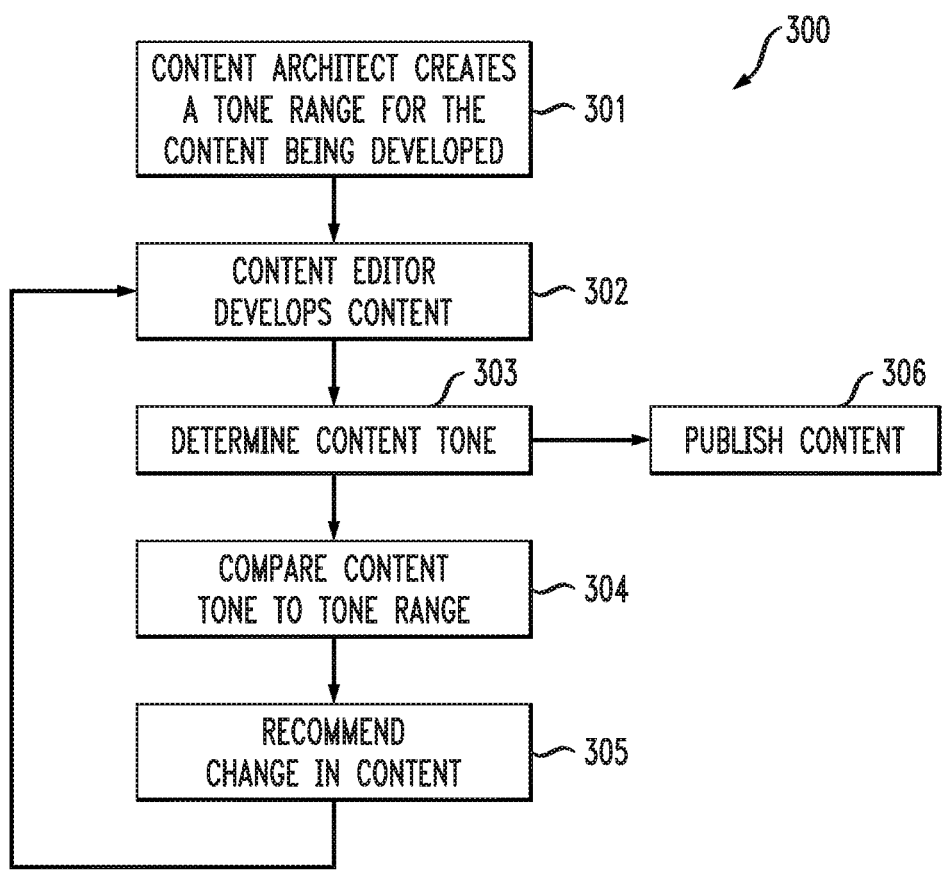
FIG. 3 is a flow diagram of method for publishing content using a tone tool according to an exemplary embodiment of the present invention.

Referring to FIG. 3 depicting a method 300 of publishing content using a tone tool, in some embodiments, a software tool is configured to receive an indication of a tone range of content to be created 301 and receiving content 302, such as content entered into a word processing application. The method includes providing content writers with a software tool comparable in usage to spelling and grammar checking. According to at least one embodiment, the software tool is configured to evaluate a current tone of the content 303 and compare the current tone to the tone range 304. According to one or more embodiments, a software tool suggests changes 305 to content to improve a tone of content, and more particularly, suggests changes to the content that shift the tone of the content to match a predetermined tone range of the content. Once a user has checked the content for tone, the content can be published 306. It should be understood that the document can be stored to memory at block 306.

It should be understood that tone, as used herein, is distinguished from sentiment or sentiment analysis, which seeks to find an opinion on a product or idea of an audience or user. Tone is a parameter affecting opinion or sentiment. Moreover, the tone described here is distinguished from tone as used in tonal languages, that how pitch of a word or phrase affects meaning.

According to some embodiments, the tone of the content can be measured as a single value within some a scoring range (e.g., between 0 and 1, or −100 and +100). According to one or more embodiments of the present invention, the tone range of content to be created 301 is a sub-range within all feasible values.

According to an embodiment of the present invention, a software tool is implemented as a framework to decide and register a base range measure of tone for some content (e.g., an intended marketing message). According to at least one embodiments of the present invention, the software tool is implemented as a plugin merged into a content development editor, wherein the plugin processes a workflow while measuring variance of the tone compared to a predetermined tone range. According to some embodiments, the software tool is implemented as a module providing an indication of how to modify the content to fit within the specified tone range, if the tone of the content is determined to fall outside of the specified tone range. According to one or more embodiments, the software tool is implemented as a monitor ensuring consistency of tone in content across multiple digital content marketing avenues (e.g., website content, social media, e-mail campaigns, mobile SMS, app updates, etc.)

According to one or more embodiments of the present invention, existing products such as the Alchemy API (or similar) can be used to measure tone of natural language text. According to some example embodiments, measurements of tone are integrated into a content editing system, for example, as a plugin. According to at least one exemplary embodiment, the system is configured to suggest to a tone range for the content (for example, using the Alchemy knowledge base).

According to one or more embodiments of the present invention, a software tool enables a user to develop a matrix of tones with predetermined ranges to be targeted (see also block 301, FIG. 3). For example:

| PARAMETER | LOW | HIGH |
|---|---|---|
| Analytical | 0.75 | 0.90 |
| Tentative | 0.25 | 0.50 |
| Fear | 0.25 | 0.40 |

In some embodiments, the matrix is input at 301 as a configuration parameter of a content development system, where values can be modified at any time by a user. According to some embodiments, the parameters (i.e., tone types) can modified, e.g., adding or deleting tone types (and associated ranges) from the parameter column within the matrix. It should be understood that the matrix can include values for a plurality of tone types, including for example, anger, fear, joy, sadness, analytical, confident, tentative, etc.

In some embodiments the tone range of a document is determined using an existing system, such as IBM Watson. For example, according to one or more embodiments of the present invention, the tone range of content indicates a highest value and a lowest value determined for each tone type within a document. The different values of a given tone type can be determined for different segments of the document (e.g., for each sentence, paragraph, phrase, etc.), such that a number of values are determined for each tone type. According to at least one embodiment of the present invention, an average value of a given tone type is determined for a given document and compared to the expected range. According to some embodiments, the tone of the different segments are individually compared to the expected range, and non-conforming segments are flagged. That is, a segment that is determined to have a tone value outside of the expected range is flagged (e.g., highlighted by the software tool).

Figure 4:
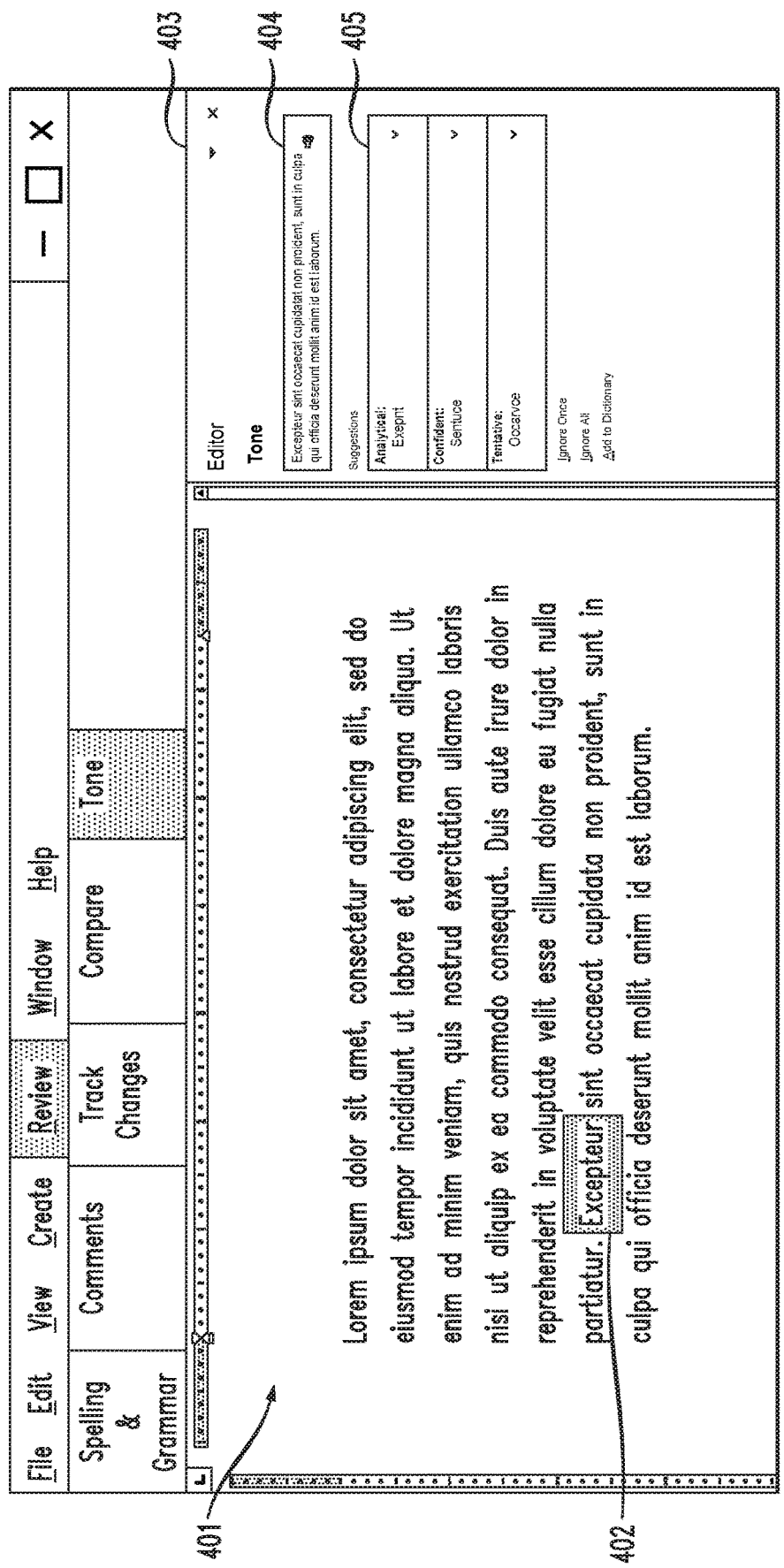
FIG. 4 is an illustration of a user interface for a tool analysis tool according to an exemplary embodiment of the present invention.

Referring to FIG. 4, according to at least one embodiment, a plugin is registered with a host application, such as a content development editor 400, and processes a workflow that calculates and measures variance of tone with content 401 as compared to predetermined ranges, such as those provided in a matrix. The plugin provides calculation and measurement functionality to the host application (e.g., Watson Alchemy) to determine a tone range of some portion of content 401. The plugin can compare a current tone of the portion of content with one or more predetermined ranges of tone and provide an indication to the user about whether the portion of content lies within the specific tone range or out of it. For example, in FIG. 4, the editor 400 includes a tone editing tool 403 of the host application 400. As shown in FIG. 4, a tone of a word or phrase 402 is determined to fall outside of one or more of the predetermined tone ranges. The word or phrase 402 is highlighted in the content and in a dialog box 404, and one or more candidate replacement words or phrases 405 are displayed for selection. The candidate replacement words can be displayed together with a result, e.g., indicating that a candidate word will increase (or decrease) one or more particular analytical tone types, for example, an analytical tone, a confident tone or a tentative tone. In some embodiments, the analytical tone types are based on the analytical tone types from the matrix, or are based on a semantic analysis to identify analytical tone types similar to those in the matrix.

In some embodiments, a software tool does not output a value for the tone of the content, and instead abstracts the tone to inform a user whether the tone meets an expectation (i.e., whether a value for the tone is within the predetermined range).

According to one or more embodiments of the present invention, the range of values is an abstraction, where for example, the analytical tone type (see 405, FIG. 4) has a range of potential abstractions or values, e.g., awareness, novice, intermediate, advanced, expert. Each of these abstractions is associated with an underlying range of values, e.g., "expert" can be associated with values 0.90-1.00 in a range of values between 0 and 1, while "intermediate" is associated with values 0.40-0.75. In the case of abstracted values, the matrix is populated with abstracted values of the tone types selected from a range of appropriate values for the tone type. In some embodiments, a user selects from the available abstractions using a dropdown menu appearing in connection with a display of the matrix in a user interface. According to some embodiments, a matrix using abstractions can be displayed as, for example:

| PARAMETER | LOW | HIGH |
| --- | --- | --- |
| Analytical | intermediate | expert |
| Tentative | 0.25 | 0.50 |
| Fear | indifferent | secure |

According to at least one embodiment, the plugin constantly evaluates content after every sentence is completed by comparing the sentence to a back-end tone analyzer application program interface (API), wherein the plugin receives a response from the API and checks whether the response complies with the baseline set, i.e., the predetermined tone range.

According to one or more embodiments of the present invention, the software tool authenticates to an API of a tone analyzer (e.g., on the cloud) by using Identity and Access Management (IAM) authentication. For example, the software tool passes a bearer token in an authorization header or an API key to the tone analyzer. The tone analyzer returns the measured tone values for the document.

According to one or more embodiments, the system is configured to recommend a change in the content, where the recommendation is selected to modify the content to comply with the baseline which has been set. In some embodiments In such a scenario, this embedded script or plugin that checks the tone range would not only provide whether current tone of content is within the baseline created but also provide a pop-up or an indicator which when clicked would show changes to be made in the content to align it with the baseline tone specified.

This system can work as a central repository to which all content editing and reviewing systems are connected, thus any content architect or campaign manager can centrally ensure that whether a piece of content is getting published as a Facebook post, twitter feed, webpage content, marketing email messages, desktop publishing systems being used for developing product brochures and catalogs or any other such thing can be managed without having to manually review each piece for alignment with tone. This can work in a way such as when a content project is launched within a content editor, it connects to the central server that hosts the content and loads pre-saved content if any but also loads the baseline tone range which it holds for as long as the content editing session for that project is active. When the content editor is closed, or the project being worked on is closed, the system clears the memory of this tone range. Thus, for a different content project a different tone range will get loaded. Any changes made to the tone range while content editing is happening are either automatically picked up or are pushed by the central system to all the editor instances which are open.

Recapitulation

According to one or more embodiments of the present invention, a method supporting content creation includes providing a content creation software product with a tone tool, receiving, by the tone tool, an expected tone range for a parameter of tone, receiving content, evaluating, by the tone tool, each of a plurality of portions of the content to determine a tone of the respective portions of the content, comparing the tone of each of the plurality of portions of the content to the expected tone range for the parameter, and providing, by the tone tool, at least one proposed modification of the content affecting a change in the tone of at least one of the portions of the content. In some embodiments providing the at least one proposed modification includes displaying the at least one proposed modification of the content in a user interface element of the content creation software product, receiving a selection of the at least one proposed modification of the content, and affecting the at least one proposed modification of the content. In some embodiments receiving the expected tone range for the parameter includes displaying a matrix, receiving input populating the matrix with the parameter, and receiving input populating the matrix with an upper value and a lower value for the parameter. In some embodiments, the method includes highlighting a selected one of the portions of the content, and displaying the tone determined for the selected one of the portions of the content. In some embodiments the at least one proposed modification is predetermined to modify the tone of the respective portion of the content to be within the expected tone range for the parameter.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for publishing content using a tone tool. Further, a computer program product can include a tangible computer-readable recordable storage medium with code adapted to be executed to carry out one or more method steps described herein, including the provision of the system with the distinct software modules.

Figure 5:
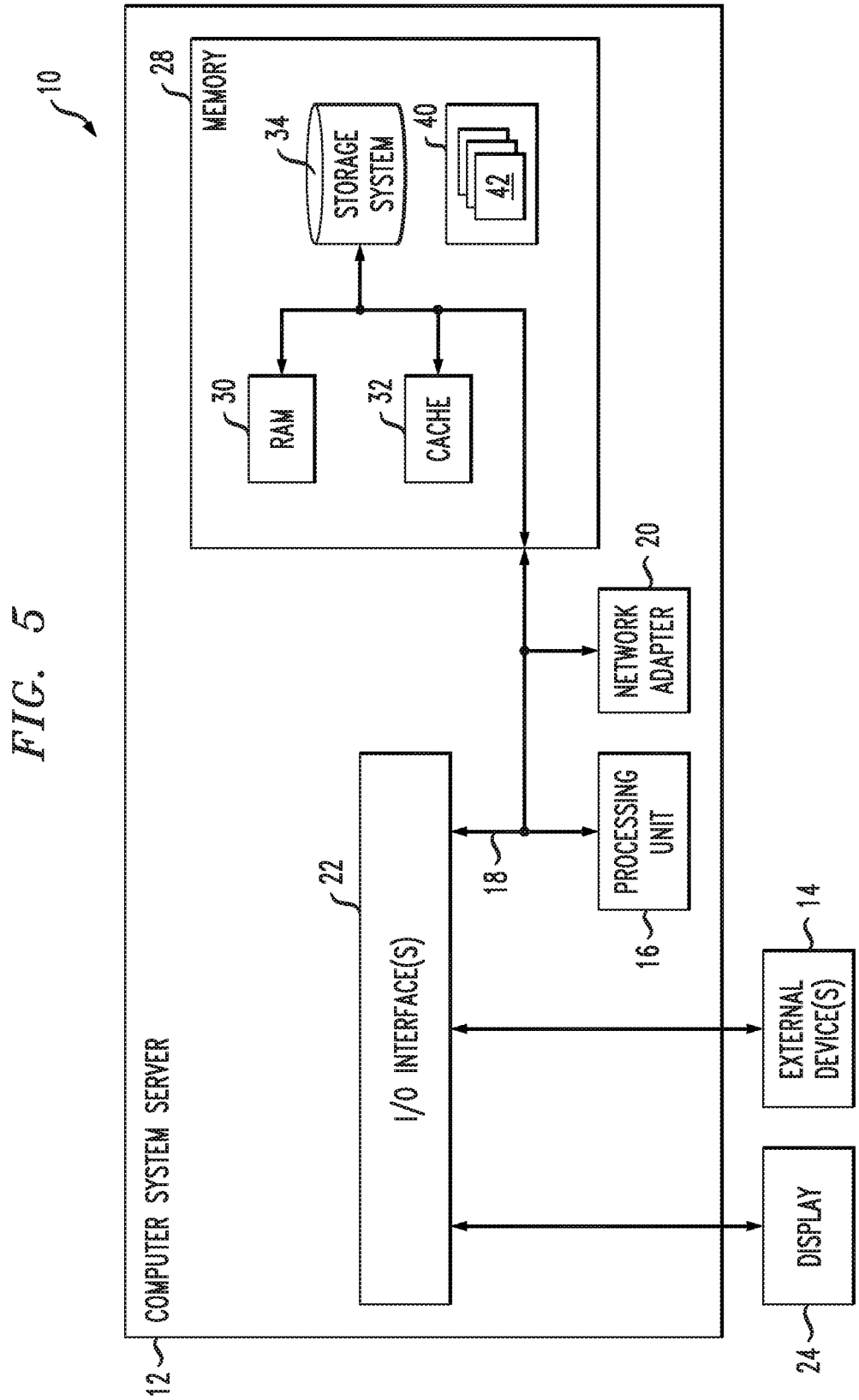
FIG. 5 is a block diagram depicting an exemplary computer system embodying a method for publishing content using a tone tool according to an exemplary embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 3, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method supporting content creation comprising:
   providing a content creation software product with a tone tool;
   receiving, by the tone tool, an expected tone range for a parameter of tone;
   receiving content;
   evaluating, by the tone tool, each of a plurality of portions of the content to determine a tone of the respective portions of the content;
   comparing the tone of each of the plurality of portions of the content to the expected tone range for the parameter;
   highlighting a selected one of the portions of the content;
   displaying the tone determined for the selected one of the portions of the content; and
   providing, by the tone tool, at least one proposed modification of the content affecting a change in the tone of the selected one of the portions of the content,
   wherein providing the at least one proposed modification comprises:
   displaying the at least one proposed modification of the content in a user interface element of the content creation software product;
   receiving a selection of the at least one proposed modification of the content; and
   affecting the at least one proposed modification of the content.

2. The method of claim 1, wherein displaying the at least one proposed modification further comprises displaying an analytical tone type associated with each of the proposed modifications.

3. The method of claim 1, wherein receiving the expected tone range for the parameter comprises:
   displaying a matrix;
   receiving input populating the matrix with at least one parameter including the parameter; and
   receiving input populating the matrix with an upper value and a lower value for each of the at least one parameter.

4. The method of claim 1, further comprising displaying a plurality of proposed modifications, including the at least one proposed modification, of the selected one of the portions of the content with an analytical tone type.

5. The method of claim 1, wherein the at least one proposed modification is predetermined to modify the tone of the selected portion of the content to be within the expected tone range for the parameter.

6. A non-transitory computer readable medium comprising computer executable instructions which when executed by a computer cause the computer to perform a method of for publishing content using a tone tool, the method comprising:
   providing a content creation software product with a tone tool;
   receiving, by the tone tool, an expected tone range for a parameter of tone;
   receiving content;

evaluating, by the tone tool, each of a plurality of portions of the content to determine a tone of the respective portions of the content;

comparing the tone of each of the plurality of portions of the content to the expected tone range for the parameter;

highlighting a selected one of the portions of the content;

displaying the tone determined for the selected one of the portions of the content; and providing, by the tone tool, at least one proposed modification of the content affecting a change in the tone of the selected one of the portions of the content, wherein providing the at least one proposed modification comprises:

displaying the at least one proposed modification of the content in a user interface element of the content creation software product;

receiving a selection of the at least one proposed modification of the content; and affecting the at least one proposed modification of the content.

7. The computer readable medium of claim 6, wherein displaying the at least one proposed modification further comprises displaying an analytical tone type associated with each of the proposed modifications.

8. The computer readable medium of claim 6, wherein receiving the expected tone range for the parameter comprises:

displaying a matrix;

receiving input populating the matrix with the parameter; and receiving input populating the matrix with an upper value and a lower value for the parameter.

9. The computer readable medium of claim 6, further comprising displaying a plurality of proposed modifications, including the at least one proposed modification, of the selected one of the portions of the content with an analytical tone type.

10. The computer readable medium of claim 6, wherein the at least one proposed modification is predetermined to modify the tone of the selected portion of the content to be within the expected tone range for the parameter.

11. The computer readable medium of claim 6, wherein providing the content creation software product with the tone tool comprises registering the tone tool as plugin with the content creation software and the plurality of portions are sentences, the method further comprising evaluating each of the sentences as each sentence is completed.

12. The method of claim 1, wherein providing the content creation software product with the tone tool comprises registering the tone tool as plugin with the content creation software and the plurality of portions are sentences, the method further comprising evaluating each of the sentences as each sentence is completed.

* * * * *